US010135380B2

(12) United States Patent
Fujiwara et al.

(10) Patent No.: US 10,135,380 B2
(45) Date of Patent: Nov. 20, 2018

(54) AC ROTARY MACHINE CONTROL APPARATUS (71) Applicant: Mitsubishi Electric Corporation, Tokyo (JP)

(72) Inventors: Michitaka Fujiwara, Hyogo (JP); Toshiaki Date, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/443,124

(22) Filed: Feb. 27, 2017

(65) Prior Publication Data
US 2017/0310267 A1 Oct. 26, 2017

(30) Foreign Application Priority Data

Apr. 22, 2016 (JP) .................................. 2016-085781

(51) Int. Cl.
*H02P 29/024* (2016.01)
*H02P 27/08* (2006.01)

(52) U.S. Cl.
CPC ............ *H02P 29/024* (2013.01); *H02P 27/08* (2013.01)

(58) Field of Classification Search
CPC ............................... H02P 29/024; H02P 27/08
USPC .......................................................... 318/478
See application file for complete search history.

(56) References Cited

U.S. PATENT DOCUMENTS 5,650,709 A * 7/1997 Rotunda ............ H02M 7/53875
318/802
5,747,955 A * 5/1998 Rotunda .................. H02P 27/08
318/432
6,356,821 B1 * 3/2002 Yoshida .................... G05B 9/02
123/333
8,953,292 B2 * 2/2015 Hebenstreit ......... G06F 13/4072
361/86

(Continued)

FOREIGN PATENT DOCUMENTS

JP 05-207008 A 8/1993
JP 10-336246 A 12/1998

(Continued)

OTHER PUBLICATIONS

Communication dated Jun. 27, 2017, issued by the Japanese Patent Office in counterpart application No. 2016-085781.

*Primary Examiner* — Kawing Chan
(74) *Attorney, Agent, or Firm* — Sughrue Mion, PLLC; Richard C. Turner (57) ABSTRACT

An AC rotary machine control apparatus is provided with: predriver ICs for giving drive signals to the gates of power converting switching elements bridge-connected to the respective phases of an AC rotary machine; predriver IC output cutting-off switching elements for operating on the basis of a cut-off signal from a calculation processing device having detected an abnormality state of the predriver ICs, and cutting off drive signals given from the predriver ICs to the gates of the power converting switching elements; and a gate driver circuit for becoming conductive on the basis of a signal from the calculation processing device and giving drive signals from a power source circuit to all the gates of the lower arm elements of the power converting switching elements, when drive signals from the predriver Ics are being cut off by the predriver IC output cutting-off switching elements.

11 Claims, 8 Drawing Sheets

(56) References Cited

U.S. PATENT DOCUMENTS

| | | | | |
|---|---|---|---|---|
| 2014/0084835 A1* | 3/2014 | Kadowaki | ............... | H02M 1/32 |
| | | | | 318/479 |
| 2014/0265979 A1* | 9/2014 | Xu | ........................... | H02P 6/12 |
| | | | | 318/478 |
| 2014/0312809 A1 | 10/2014 | Ishida et al. | | |
| 2015/0109020 A1* | 4/2015 | Morino | .............. | G01R 19/0092 |
| | | | | 324/764.01 |

FOREIGN PATENT DOCUMENTS

| | | | | |
|---|---|---|---|---|
| JP | 2002-064984 A | 2/2002 | | |
| JP | 2010279122 A | * 12/2010 | ............ | H02M 3/156 |
| JP | 2012-124716 A | 6/2012 | | |
| JP | 2013-158169 A | 8/2013 | | |
| JP | 2014-138494 A | 7/2014 | | |
| JP | 2014-158399 A | 8/2014 | | |
| WO | 2015/104921 A1 | 7/2015 | | |

\* cited by examiner

AC ROTARY MACHINE CONTROL APPARATUS

BACKGROUND OF THE INVENTION

1. Field of the Invention

The present invention relates to an AC rotary machine control apparatus which controls driving of an AC rotary machine such as a driving motor mounted on an electric motor vehicle such as an electric automobile or a hybrid automobile.

2. Description of the Background Art

Conventional AC rotary machine control apparatuses have electric power converting functions of converting DC power supplied from DC power sources for driving AC rotary machines to AC power, or converting AC power generated by AC rotary machines to DC power for charging DC power sources. In order to achieve such an electric power converting function, an electric power converting apparatus generally uses bridge-connected switching elements such as MOSFETs (Metal Oxide Semiconductor Field Effect Transistors). The switching elements are driven by a predriver IC having received an instruction from a calculation processing device such as a microcomputer. In the predriver IC, multiple functions including not only a function of driving the switching elements but also a function of detecting a short-circuit failure in the switching elements are integrated. That is, a predriver IC has been proposed which has a current detecting unit to have a function of cutting off, when the predriver IC has a failure, an abnormal current section of the circuit part, and fixing an output of the predriver circuit to be Low or Hi such that the output of the predriver IC is non-active (for example, International Publication No. WO 2015/104921 A1).

A conventional AC rotary machine control apparatus assumes that a failure mode due to abnormal current or the like, which is incorporated as a function of a predriver IC, is expected in advance, and cannot take a countermeasure against occurrence of an unexpected failure mode. Further, there is no description of a countermeasure against a case where a predriver IC erroneously operates and stops functioning due to an influence of the surrounding environment such as the temperature and noise, and the predriver IC needs to be reset to be normally operable. Thus, there has been a problem that no countermeasure can be taken against such a case.

SUMMARY OF THE INVENTION

The present invention has been made in order to solve the above problems, and an object of the present invention is to provide an AC rotary machine control apparatus which can take a countermeasure against a case where a predriver IC enters an abnormal state and stops functioning due to an unexpected failure mode or an influence of the surrounding environment such as the temperature and noise, so as to prevent an unstable state of an AC rotary machine from continuing.

An AC rotary machine control apparatus according to the present invention includes: switching elements bridge-connected to phases of an AC rotary machine to configure upper arm elements and lower arm elements; a calculation processing device for outputting a control signal for controlling the AC rotary machine; a predriver IC for giving a drive signal to gates of the switching elements on the basis of the control signal outputted from the calculation processing device; a predriver IC output cutting-off switching element for operating on the basis of a cutting-off signal from the calculation processing device having detected an abnormality state of the predriver IC, and cutting off the drive signal given from the predriver IC to the gates of the switching elements; and a gate driver circuit for becoming conductive on the basis of a signal from the calculation processing device and giving drive signals to the gates of either all the upper arm elements or all the lower arm elements of the switching elements, when the drive signal from the predriver IC is being cut off by the predriver IC output cutting-off switching element.

According to the present invention, provided are: the switching elements bridge-connected to the phases of the AC rotary machine to configure the upper arm elements and the lower arm elements; the calculation processing device for outputting a control signal for controlling the AC rotary machine; the predriver IC for giving a drive signal to the gates of the switching elements on the basis of the control signal outputted from the calculation processing device; the predriver IC output cutting-off switching element for operating on the basis of a cutting-off signal from the calculation processing device having detected an abnormality state of the predriver IC, and cutting off the drive signal given from the predriver IC to the gates of the switching elements; and the gate driver circuit for becoming conductive on the basis of a signal from the calculation processing device and giving drive signals to the gates of either all the upper arm elements or all the lower arm elements of the switching elements, when the drive signal from the predriver IC is being cut off by the predriver IC output cutting-off switching element. Therefore, the present invention can provide an advantageous effect of providing an AC rotary machine control apparatus which can take a countermeasure against a case where the predriver IC enters an abnormal state and stops functioning due to an unexpected failure mode or an influence of the surrounding environment such as the temperature and noise, so as to prevent an unstable state of the AC rotary machine from continuing.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

Hereinafter, embodiments of the present invention will be described. However, identical or corresponding components are denoted by same reference characters throughout the drawings.

First Embodiment

Figure 1:
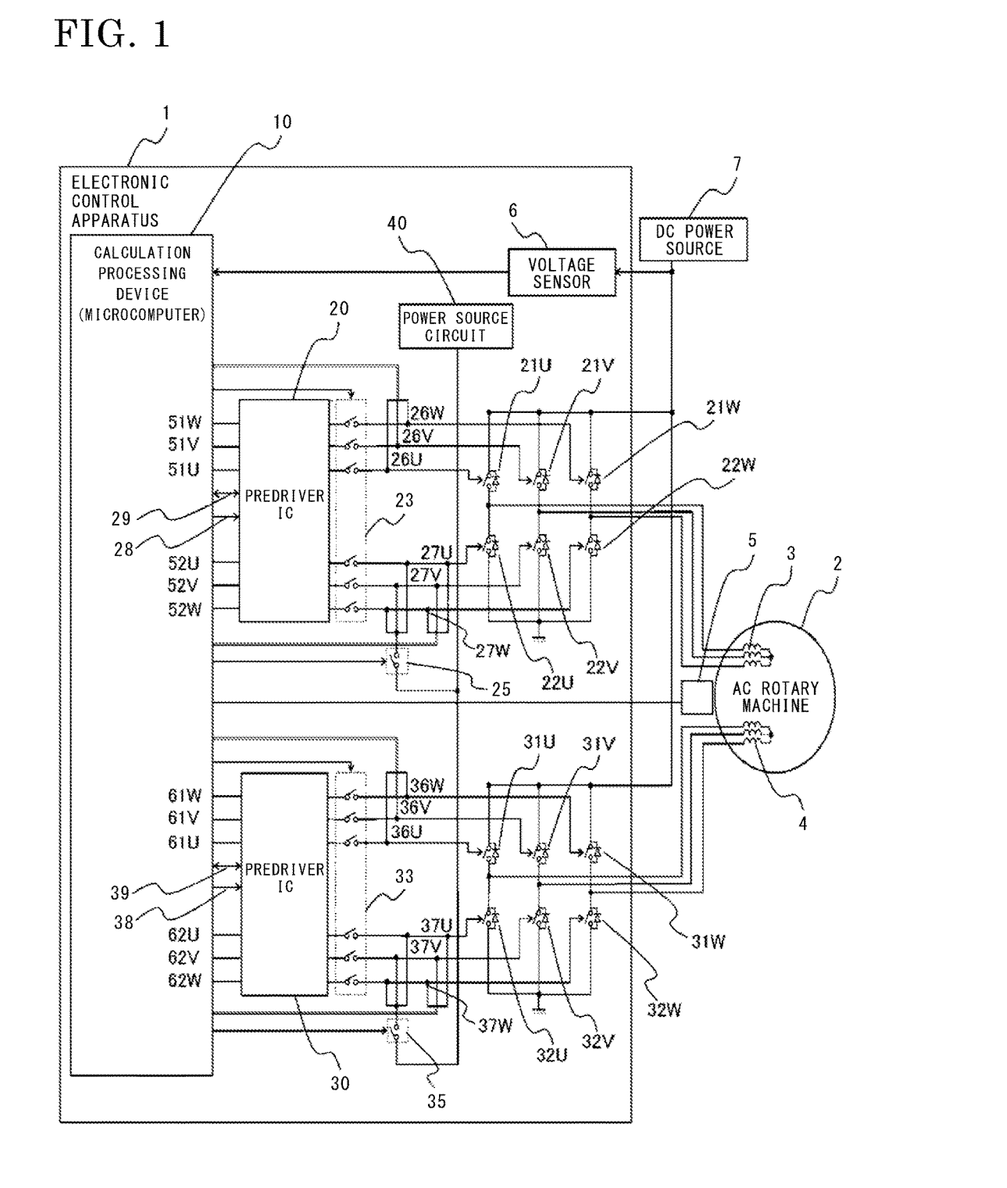
FIG. 1 is a schematic configuration diagram showing an AC rotary machine control apparatus according to a first embodiment of the present invention.
Figure 2:
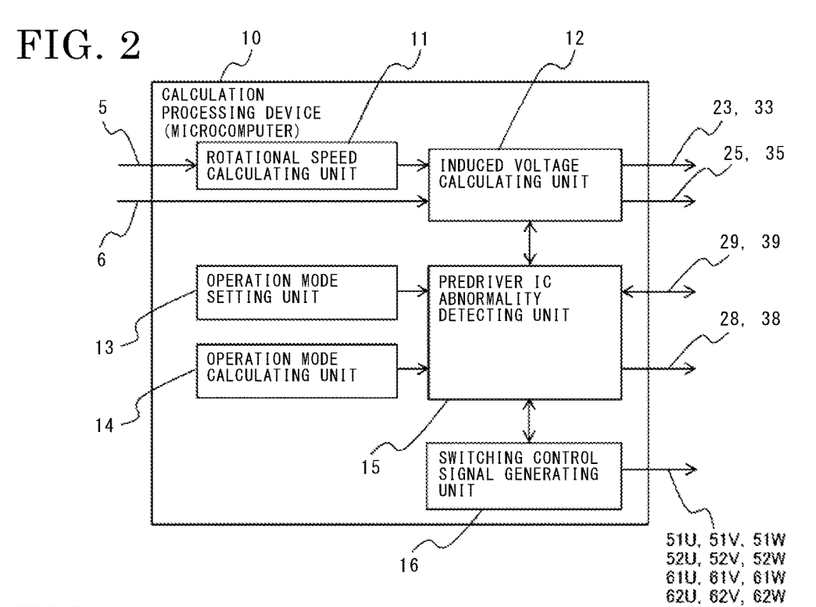
FIG. 2 is a block diagram showing the internal configuration of a calculation processing device of the AC rotary machine control apparatus according to the first embodiment of the present invention.
Figure 3:
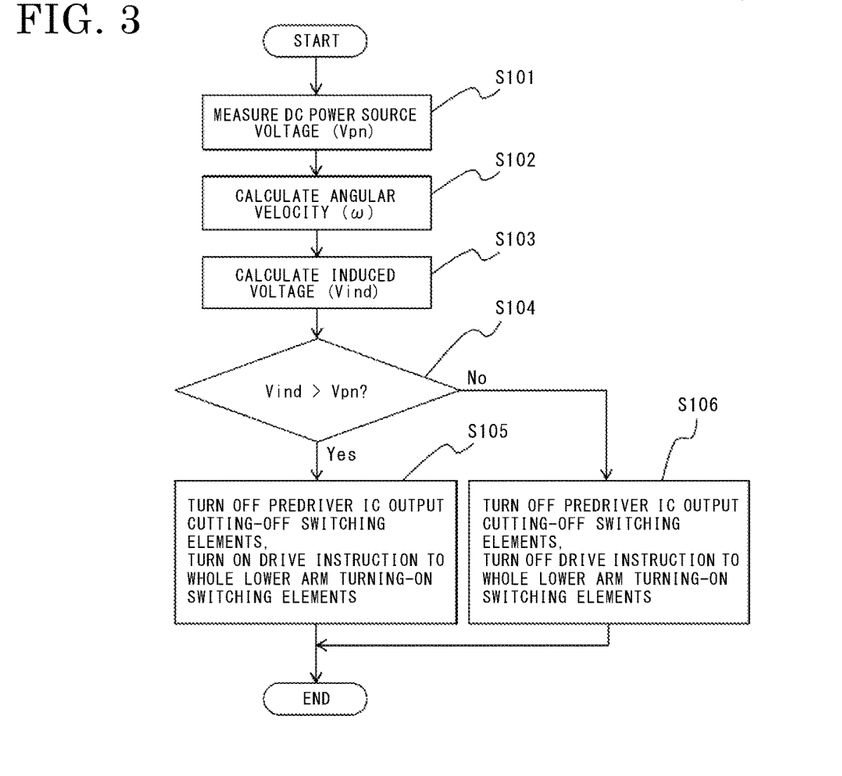
FIG. 3 is a flowchart showing an operation of an induced voltage calculating unit in the calculation processing device of the AC rotary machine control apparatus according to the first embodiment of the present invention.
Figure 4:
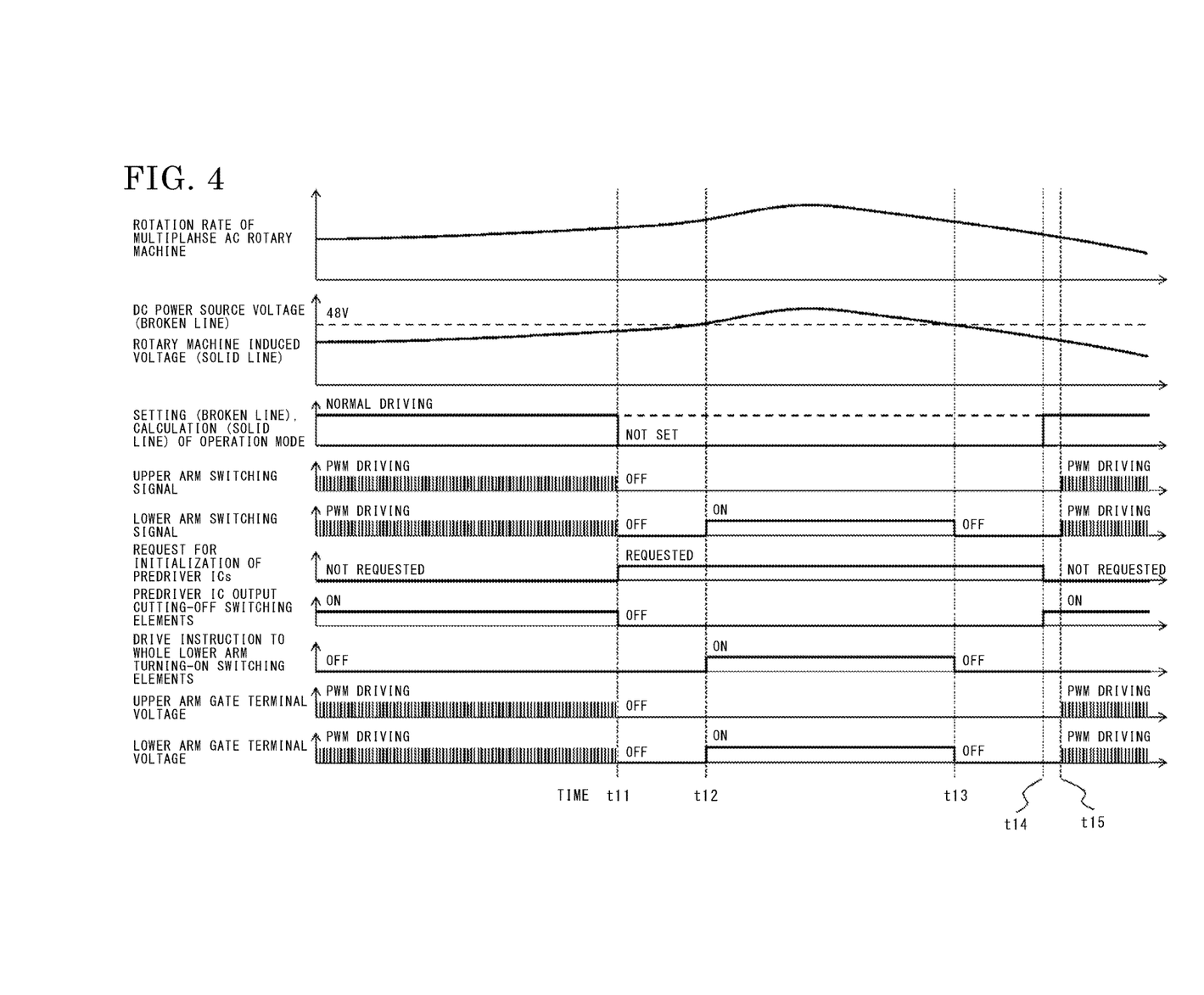
FIG. 4 is a diagram showing the states of respective components of the AC rotary machine control apparatus according to the first embodiment of the present invention when an abnormality occurs therein.

FIG. 1 is a schematic configuration diagram showing an AC rotary machine control apparatus according to a first embodiment of the present invention. FIG. 2 is a block diagram showing the internal configuration of a calculation processing device of the AC rotary machine control apparatus according to the first embodiment of the present invention. FIG. 3 is a flowchart showing an operation of an induced voltage calculating unit in the calculation processing device of the AC rotary machine control apparatus according to the first embodiment of the present invention. FIG. 4 is a diagram showing the states of components of the AC rotary machine control apparatus according to the first embodiment of the present invention when an abnormality occurs therein.

In FIG. 1, an electronic control apparatus 1 controls an AC rotary machine 2 which is mounted on an electric motor vehicle such as an electric automobile or a hybrid automobile, and which is a multiphase AC rotary machine (in FIG. 1, a double three-phase motor including two winding sets) operating as a driving motor and a power generator. The AC rotary machine 2 includes a first winding set 3 and a second winding set 4. The electronic control apparatus 1 is provided with: power converting switching elements 21U, 21V, 21W, 22U, 22V, and 22W which are bridge-connected to the respective phases of the first winding set 3 of the AC rotary machine 2 and which convert electric power from an external DC power source 7; power converting switching elements 31U, 31V, 31W, 32U, 32V, and 32W which are bridge-connected to the respective phases of the second winding set 4 of the AC rotary machine 2 and which convert electric power from the external DC power source 7; a calculation processing device 10 for outputting control signals for controlling driving of the AC rotary machine 2; a first winding set predriver IC 20 for outputting drive signals to the gate terminals of the switching elements 21U, 21V, 21W, 22U, 22V, and 22W on the basis of control signals 51U, 51V, 51W, 52U, 52V, and 52W outputted from the calculation processing device 10; and a second winding set predriver IC 30 for outputting drive signals to the gate terminals of the switching elements 31U, 31V, 31W, 32U, 32V, and 32W on the basis of control signals 61U, 61V, 61W, 62U, 62V, and 62W outputted from the calculation processing device 10.

The calculation processing device 10 receives and monitors a rotation angle detected by a rotation angle sensor 5 for detecting a rotation angle of the rotation shaft of the AC rotary machine 2, a voltage value measured by a voltage sensor 6 for measuring a voltage at the DC power source 7 which supplies drive electric power to the AC rotary machine 2 and stores electric power generated by the AC rotary machine 2, drive signals 26U, 26V, and 26W outputted from the predriver IC and given to the gate terminals of the switching elements 21U, 21V, and 21W for a first winding set upper arm, drive signals 27U, 27V, and 27W outputted from the predriver IC and given to the gate terminals of the switching elements 22U, 22V, and 22W for a first winding set lower arm, drive signals 36U, 36V, and 36W outputted from the predriver IC and given to the gate terminals of the switching elements 31U, 31V, and 31W for a second winding set upper arm, and drive signals 37U, 37V, and 37W outputted from the predriver IC and given to the switching elements 32U, 32V, and 32W for a second winding set lower arm.

In order to initialize driving of the predriver ICs, an enable signal line 28 for the first winding set predriver IC 20 and an enable signal line 38 for the second winding set predriver IC 30 are connected between the calculation processing device 10 and the first winding set predriver IC 20 and between the calculation processing device 10 and the second winding set predriver IC 30, respectively. When an enable signal, which is set to High during a normal operation, is temporarily set to Low for a predetermined time (for example, 10 microseconds) on the basis of an instruction from the calculation processing device 10, the corresponding predriver IC is restarted and initialized. In addition, in order to perform communication (for example, SPI communication) to exchange the internal settings or internal states and abnormality information of the predriver ICs with the calculation processing device 10, a communication path 29 for the first winding set predriver IC 20 and a communication path 39 for the second winding set predriver IC 30 are provided between the calculation processing device 10 and the first winding set predriver IC 20 and between the calculation processing device 10 and the second winding set predriver IC 30, respectively.

In order to cut off outputs from the predriver ICs, a first-winding-set predriver IC output cutting-off switching element 23 and a second-winding-set predriver IC output cutting-off switching element 33 are provided at the rear-stage output sides of the first winding set predriver IC 20 and the second winding set predriver IC 30, respectively. Thus, all switching signals for the upper and lower arm elements, which are outputted from the predriver ICs, can be collectively cut off on the basis of an instruction from the calculation processing device 10. In addition, a whole first-winding-set lower arm turning-on switching element 25 and a whole second-winding-set lower arm turning-on switching element 35 are provided which configure respective gate driver circuits for giving drive signals from the power source circuit 40, not through the predriver ICs, to all the gate terminals of the switching elements 22U, 22V, and 22W for the first winding set lower arm and the switching elements 32U, 32V, and 32W for the second winding set lower arm.

The switching elements 25 and 35 become conductive on the basis of an instruction from the calculation processing device 10 so that all the lower arm switching elements 22U, 22V, 22W, 32U, 32V, and 32W can be collectively turned on in the first winding set and the second winding set, not through the predriver ICs.

An example of the internal configuration of the calculation processing device 10 will be described on the basis of FIG. 2.

The calculation processing device 10 includes: a rotational speed calculating unit 11 for calculating, from a rotation angle detected by the rotation angle sensor 5, an angular velocity ω [rad/sec.] of the rotation shaft of the AC rotary machine 2; an induced voltage calculating unit 12 for obtaining an induction voltage Vind [V] by calculating Vind=√2×ω×φ from the angular velocity ω calculated by the rotational speed calculating unit 11 and an armature interlinkage magnetic flux φ [wb] of the AC rotary machine 2 obtained in advance, and outputting, on the basis of a result of comparing Vind with a predetermined value determined from a voltage value measured by the voltage sensor 6, open/close instruction signals to the first-winding-set predriver IC output cutting-off switching element 23, the second-winding-set predriver IC output cutting-off switching element 33, the whole first-winding-set lower arm turning-on switching element 25, and the whole second-winding-set lower arm turning-on switching element 35; an operation mode setting unit 13 for setting the predriver ICs to arbitrary operation modes; an operation mode calculating unit 14 for checking whether operation modes are correctly set for the predriver ICs; a predriver IC abnormality detecting unit 15 for detecting occurrence of an abnormality in the predriver ICs, by checking, via the communication paths 29 and 39, the setting states or internal states of the predriver ICs periodically (for example, every one millisecond) and for starting or restarting, when detecting occurrence of an abnormality, the predriver ICs by starting the induced voltage calculating unit 12 and by outputting enable signals to the enable signal lines 28 and 38; and a switching control signal generating unit 16 for generating and outputting control signals 51U, 51V, 51W, 52U, 52V, 52W, 61U, 61V, 61W, 62U, 62V, and 62W for PWM-controlling the AC rotary machine 2 during a normal operation.

Next, operations will be described on the basis of FIG. 4. FIG. 4 is a diagram showing the signal states of the respective components over time which is represented in the horizontal direction.

In normal start-up, the calculation processing device 10 outputs High enable signals to the enable signal lines 28 and 38 to cause the first winding set predriver IC 20 and the second winding set predriver IC 30 to enter driving states, and transmits settings via the communication paths 29 and 39, to output PWM drive signals from the first winding set predriver IC 20 and the second winding set predriver IC 30 to the gate terminals of the power converging switching elements 21U, 21V, 21W, 22U, 22V, 22W, 31U, 31V, 31W, 32U, 32V, and 32W, which are bridge-connected thereto, on the basis of the control signals 51U, 51V, 51W, 52U, 52V, 52W, 61U, 61V, 61W, 62U, 62V, and 62W outputted from the switching control signal generating unit 16.

When the predriver ICs are normally operating prior to time t11 shown in FIG. 4, the calculation processing device 10 outputs upper and lower arm elements control signals necessary for controlling the AC rotary machine 2, and PWM-drives the switching elements by using the PWM drive signals outputted via the predriver ICs. At that time, the first-winding-set predriver IC output cutting-off switching element 23 and the second-winding-set predriver IC output cutting-off switching element 33 are in ON (conductive) states, and output OFF to the whole first-winding-set lower arm turning-on switching element 25 and the whole second-winding-set lower arm turning-on switching element 35, respectively, so that drive signals outputted from the predriver ICs to the gate terminals of the switching elements are not inhibited.

Next, the case of an abnormal state from time t11 to t15 shown in FIG. 4 will be described.

At time t11, if the predriver ICs erroneously operate due to the surrounding environment such as the temperature and noise and a shift to an unintended operation mode occurs, the predriver IC abnormality detecting unit 15 of the calculation processing device 10 detects the abnormality state from the internal information of the predriver ICs acquired via the communication paths 29 and 39 relative to the predriver ICs. Alternatively, the predriver IC abnormality detecting unit 15 estimates the operation mode from the acquired internal information by using the operation mode calculation unit 14, compares the estimated operation mode with an operation mode set by the operation mode setting unit 13, and detects, when the operation modes do not match with each other, the abnormality of the predriver ICs.

The predriver IC abnormality detecting unit 15 having detected an abnormality of the internal states of the predriver ICs notifies the induced voltage calculating unit 12 and the switching control signal generating unit 16 of occurrence of the abnormality of the predriver ICs, and outputs Low enable signals through the enable signal lines 28 and 38 for a predetermined time to restart the predriver ICs, thereby initializing the predriver ICs. This state is a state where initialization of the predriver ICs is requested.

The induced voltage calculating unit 12 having been notified of occurrence of the abnormality of the predriver IC instructs the first-winding-set predriver IC output cutting-off switching element 23 and the second-winding-set predriver IC output cutting-off switching element 33 to turn off (cut off) the switching elements, to cut off PWM drive signals which are outputted from the predriver ICs and given to the gate terminals of the power converting switching elements, and performs the operation of the flowchart shown in FIG. 3 at predetermined time intervals to maintain the stable state of the AC rotary machine 2.

The switching control signal generating unit 16 having been notified of occurrence of the abnormality of the predriver IC stops generating and outputting control signals.

An operation of the induced voltage calculating unit 12 will be described on the basis of FIG. 3.

At step S101, the induced voltage calculating unit 12 measures a voltage Vpn at the DC power source 7 by using the voltage sensor 6 to determine a predetermined value. Herein, the voltage Vpn is the predetermined value to which 48V indicated by a broken line shown in FIG. 4 corresponds.

At step S102, the angular velocity ω is calculated by the rotational speed calculating unit 11 using a value measured by the rotation angle sensor 5, and is inputted to the induced voltage calculating unit 12.

At step S103, the induced voltage calculating unit 12 calculates the induced voltage Vind on the basis of the angular velocity ω calculated by the rotational speed calculating unit 11 and the armature interlinkage magnetic flux φ of the AC rotary machine 2 obtained in advance, and the operation proceeds to step S104.

At step S104, the induced voltage calculating unit 12 compares the magnitude of the calculated induced voltage Vind with that of the power source voltage Vpn, which is the predetermined value. When the induced voltage Vind is determined to be greater than the power source voltage Vpn, the operation proceeds to step S105. When the induced voltage Vind is determined to be less than the power source voltage Vpn, the operation proceeds to step S106.

At step S105, the induced voltage calculating unit 12 turns on (conducts) drive instructions to the whole first-winding-set lower arm turning-on switching element 25 and the whole second-winding-set lower arm turning-on switching element 35, while the first-winding-set predriver IC output cutting-off switching element 23 and the second-winding-set predriver IC output cutting-off switching element 33 are kept off. Accordingly, drive signals from the power source circuit 40 are given to all the gate terminals of the switching elements 22U, 22V, and 22W for the first winding set lower arm and the switching elements 32U, 32V, and 32W for the second winding set lower arm. As a result of this, voltages at all the gate terminals of the upper arm are off and voltages at all the gate terminals of the lower arm are on. Accordingly, all the switching elements of the lower arm are conductive, and the AC rotary machine 2 enters a three-phase short circuit state, so that no power is generated. Thus, no power flows into the DC power source 7, so that the AC rotary machine 2 enters a stable state. This state corresponds to the range from time t12 to t13 shown in FIG. 4 in which the induced voltage Vind is greater than the power source voltage Vpn.

At step S106, the induced voltage calculating unit 12 turns off (cuts off) drive instructions to the whole first-winding-set lower arm turning-on switching element 25 and the whole second-winding-set lower arm turning-on switching element 35, while the first-winding-set predriver IC output cutting-off switching element 23 and the second-winding-set predriver IC output cutting-off switching element 33 are kept off. As a result of this, voltages at all the gate terminals of the upper arm are off and voltages at all the gate terminals of the lower arm are also off. Thus, all the connections between the AC rotary machine 2 and the DC power source 7 enter cut-off states, so that power generated by the AC rotary machine 2 does not flow into the DC power source 7, and the AC rotary machine 2 also enters a stable state. This state corresponds to the range from time t11 to t12 shown in FIG. 4 and the range from time t13 to t14 shown in FIG. 4 in which the induced voltage Vind decreases again.

The case where the predetermined voltage value is the power source voltage Vpn has been described above. However, hysteresis may be provided to the predetermined voltage value because comparison between the induced voltage and the predetermined voltage value results in prevention of hunting.

Next, at time t14 in FIG. 14, the calculation processing device 10 estimates, using the operation mode calculation unit 14, the operation mode from the internal information of the predriver ICs acquired via the communication paths 29 and 39. When the estimated operation mode matches the operation mode set by the operation mode setting unit 13, the calculation processing device 10 determines that initialization through restart has been completed and the predriver ICs become normally operable, and changes the request for initialization of the predriver ICs to a not-requested state.

The calculation processing device 10 causes the settings of the first winding set predriver IC 20 and the second winding set predriver IC 30 before the recovery to match with the immediately previous gate drive states which are outputted by the first-winding-set predriver IC output cutting-off switching element 23, the second-winding-set predriver IC output cutting-off switching element 33, the whole first-winding-set lower arm turning-on switching element 25, and the whole second-winding-set lower arm turning-on switching element 35, and then turns on (makes conductive) the first-winding-set predriver IC output cutting-off switching element 23 and the second-winding-set predriver IC output cutting-off switching element 33, while the whole first-winding-set lower arm turning-on switching element 25 and the whole second-winding-set lower arm turning-on switching element 35 are off, so that drive signals outputted from the predriver ICs to the gate terminals are not inhibited.

Specifically, in the case of FIG. 4, for example, since voltages at the gate terminals of all the upper and lower arm switching elements are off at a time immediately before time t14, recovery is performed at time t14 while all the duty ratios for performing PWM driving in the predriver ICs are set to 0%.

If, in the state immediately before recovery, voltages at the gate terminals of all the upper arm switching elements are off and voltages at the gate terminals of all the lower arm switching elements are on, as in the period from t12 to t13 in FIG. 4, recovery is performed while the duty ratios for performing PWM driving in the upper arm and the duty ratios for performing PWM driving in the lower arm are set to 0% and 100%, respectively.

In this way, no fluctuation occurs at a time of recovery switching, and a stable state can be maintained.

Next, after the predriver ICs recover to normal operations, at time t15 in FIG. 4, the calculation processing device 10 outputs, from the switching control signal generating unit 16, upper and lower arm control signals necessary for controlling the AC rotary machine 2, and gives PWM control signals outputted via the predriver ICs to the gate terminals of the bridge-connected power converting switching elements, thereby driving the switching elements. The predriver ICs are normally operated at time t15 or later.

As described above, even when the predriver ICs erroneously operate due to an unexpected failure mode or an influence of the surrounding environment such as the temperature and noise, and stop the outputting functions to the gate terminals, the AC rotary machine is shifted to and held in a stable state, and the predriver ICs are reset while the stable state is being held. Thus, an unstable state of the AC rotary machine does not continue and the stable state can be held. While the stable state is held, the predriver ICs can be initialized and reset to recover to normal operations. Thus, deterioration of drivability can also be prevented.

Second Embodiment

Figure 5:
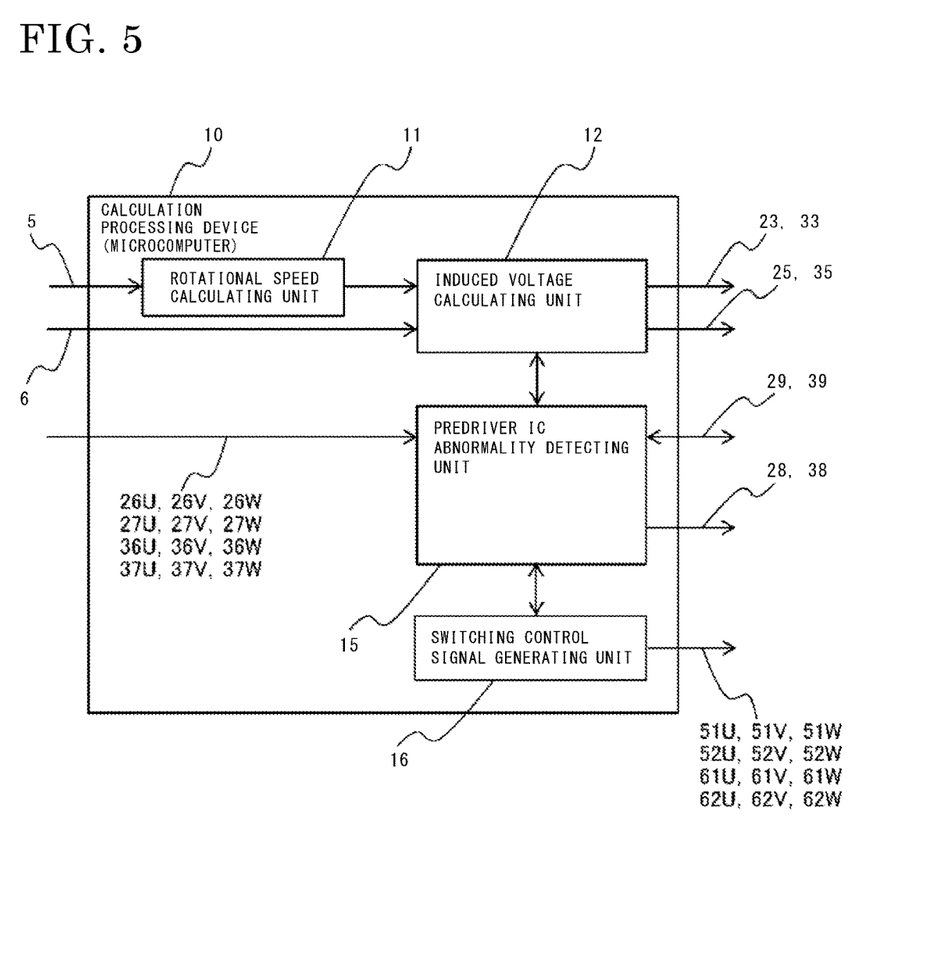
FIG. 5 is a block diagram showing the internal configuration of a calculation processing device of an AC rotary machine control apparatus according to a second embodiment of the present invention.
Figure 6:
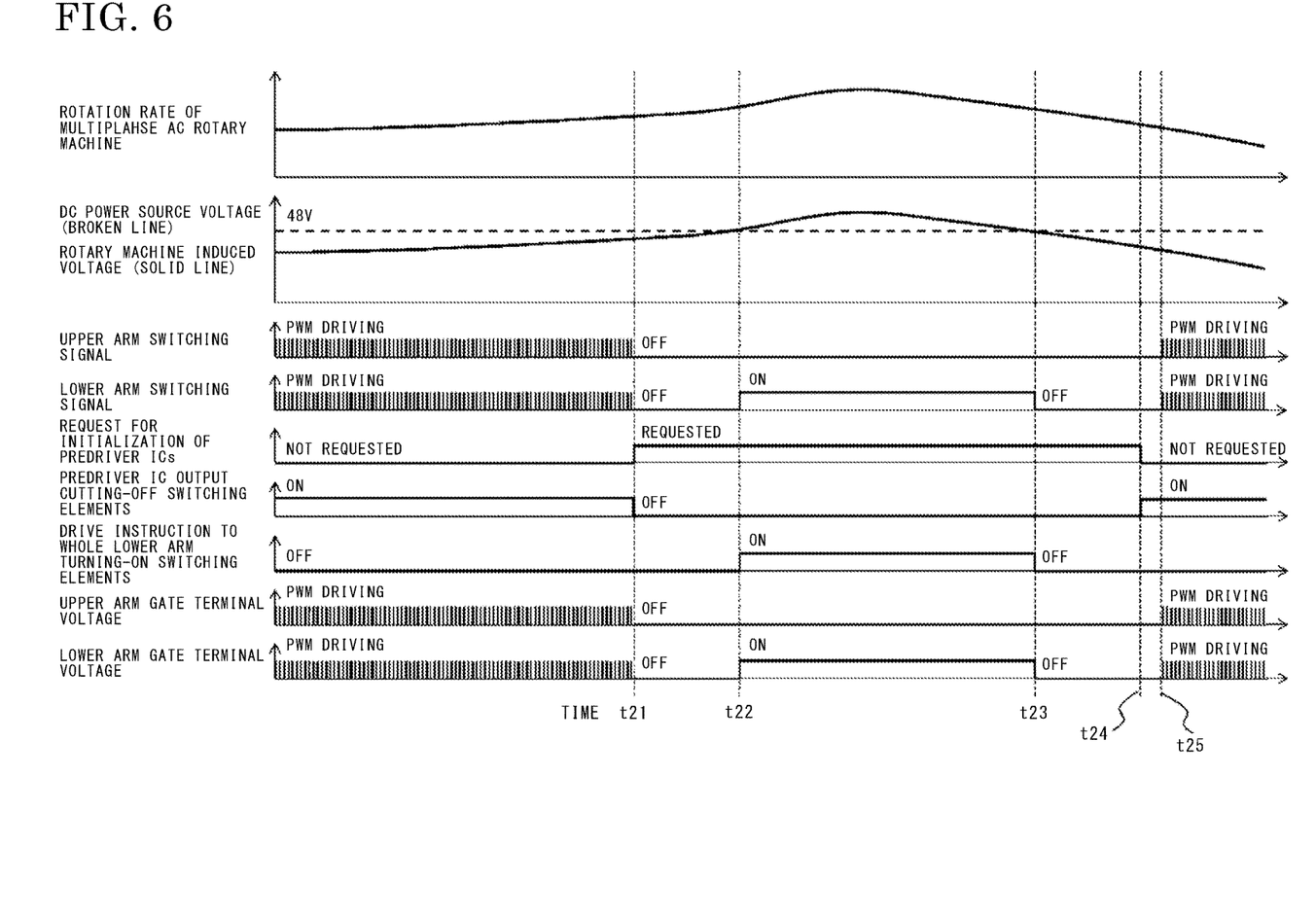
FIG. 6 is a diagram showing the states of respective components of the AC rotary machine control apparatus according to the second embodiment of the present invention when an abnormality occurs therein.

FIG. 5 is a block diagram showing the internal configuration of a calculation processing device of an AC rotary machine control apparatus according to a second embodiment of the present invention. FIG. 6 is a diagram showing the states of respective components of the AC rotary machine control apparatus according to the second embodiment of the present invention when an abnormality occurs therein.

In the aforementioned first embodiment, the case where the predriver IC abnormality detecting unit 15 detects an abnormality from the internal information of the predriver ICs acquired via the communication paths 29 and 39 relative to the predriver ICs has been described. In the second embodiment, a description will be given of a case where, as shown in FIG. 5, the predriver IC abnormality detecting unit 15 compares the periodically monitored signals 26U, 26V, 26W, 27U, 27V, 27W, 36U, 36V, 36W, 37U, 37V, and 37W outputted from the predriver ICs with the control signals 51U, 51V, 51W, 52U, 52V, 52W, 61U, 61V, 61W, 62U, 62V, and 62W, which are generated by the switching control signal generating unit 16 and given to the predriver ICs, and detects an abnormality of the predriver ICs when the signals do not match with each other.

The other parts are identical to those in the aforementioned first embodiment, and thus the description thereof is omitted.

Operations in the second embodiment will be described on the basis of FIG. 6.

Operations when the predriver ICs normally operate prior to time t21 shown in FIG. 6 are identical to those prior to time t1 in the first embodiment, and thus the description thereof is omitted.

When the predriver ICs erroneously operate due to the surrounding environment such as the temperature and noise and a shift to an unintended operation mode occurs at time t21, the predriver IC abnormality detecting unit 15 of the calculation processing device 10 compares the periodically monitored signals 26U, 26V, 26W, 27U, 27V, 27W, 36U, 36V, 36W, 37U, 37V, and 37W outputted from the predriver ICs with the control signals 51U, 51V, 51W, 52U, 52V, 52W, 61U, 61V, 61W, 62U, 62V, and 62W, which are generated by the switching control signal generating unit 16 and given to the predriver ICs. When the signals do not match with each other, the predriver IC abnormality detecting unit 15 detects an abnormality of the predriver ICs.

The predriver IC abnormality detecting unit 15 having detected an abnormality of the output signals of the predriver ICs notifies the induced voltage calculating unit 12 and the switching control signal generating unit 16 of occurrence of the abnormality of the predriver ICs, and outputs Low enable signals from the enable signal lines 28 and 38 for a predetermined time to restart the predriver ICs, thereby initializing the predriver ICs. This state is a state where initialization of the predriver ICs is requested.

The induced voltage calculating unit 12 having been notified of occurrence of the abnormality of the predriver ICs instructs the first-winding-set predriver IC output cutting-off switching element 23 and the second-winding-set predriver IC output cutting-off switching element 33 to be turned off (cut off), to cut off PWM drive signals which are outputted from the predriver ICs and given to the gate terminals of the power converting switching elements, and performs the operation of the flowchart in FIG. 3 at predetermined time intervals to maintain the stable state of the AC rotary machine 2.

The switching control signal generating unit 16 having been notified of occurrence of the abnormality of the predriver ICs stops generating and outputting control signals.

Operations after time t21 in FIG. 6 are identical to those after time t11 in FIG. 4 of the first embodiment, and thus the description thereof is omitted.

As described above, in the second embodiment, when the predriver ICs erroneously operate due to an unexpected failure mode or an influence of the surrounding environment such as the temperature and noise, it is possible to detect an abnormality of the predriver ICs on the basis of outputs from the predriver ICs without acquiring the internal information of the predriver ICs through a communication path or the like.

The other effects are identical to those in the first embodiment, and thus the description thereof is omitted.

Third Embodiment

Figure 7:
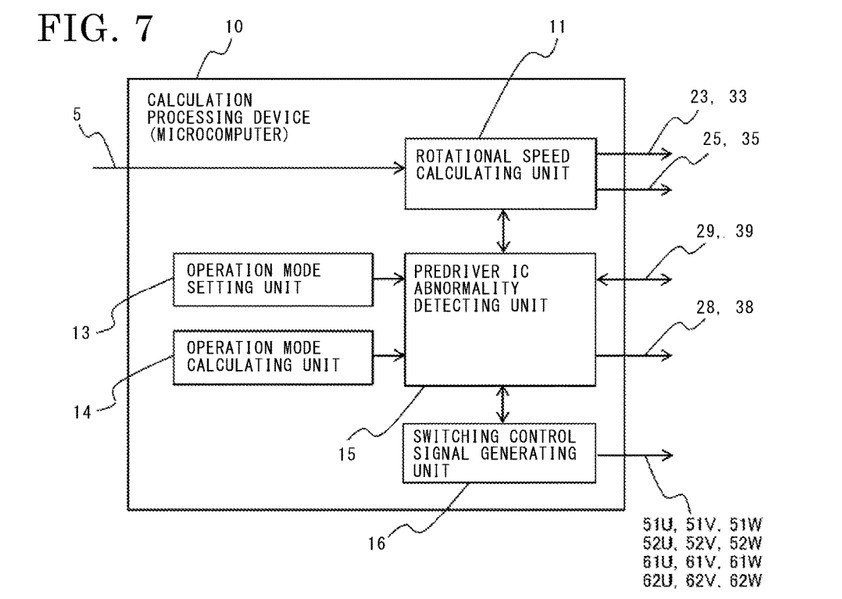
FIG. 7 is a block diagram showing the internal configuration of a calculation processing device of an AC rotary machine control apparatus according to a third embodiment of the present invention.
Figure 8:
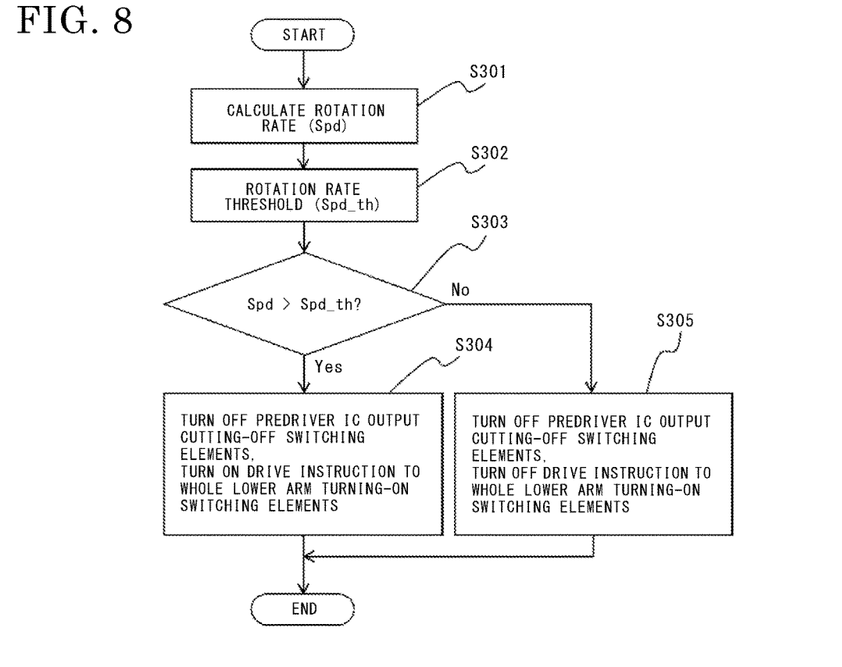
FIG. 8 is a flowchart showing an operation of a rotational speed calculating unit in the calculation processing device of the AC rotary machine control apparatus according to the third embodiment of the present invention.
Figure 9:
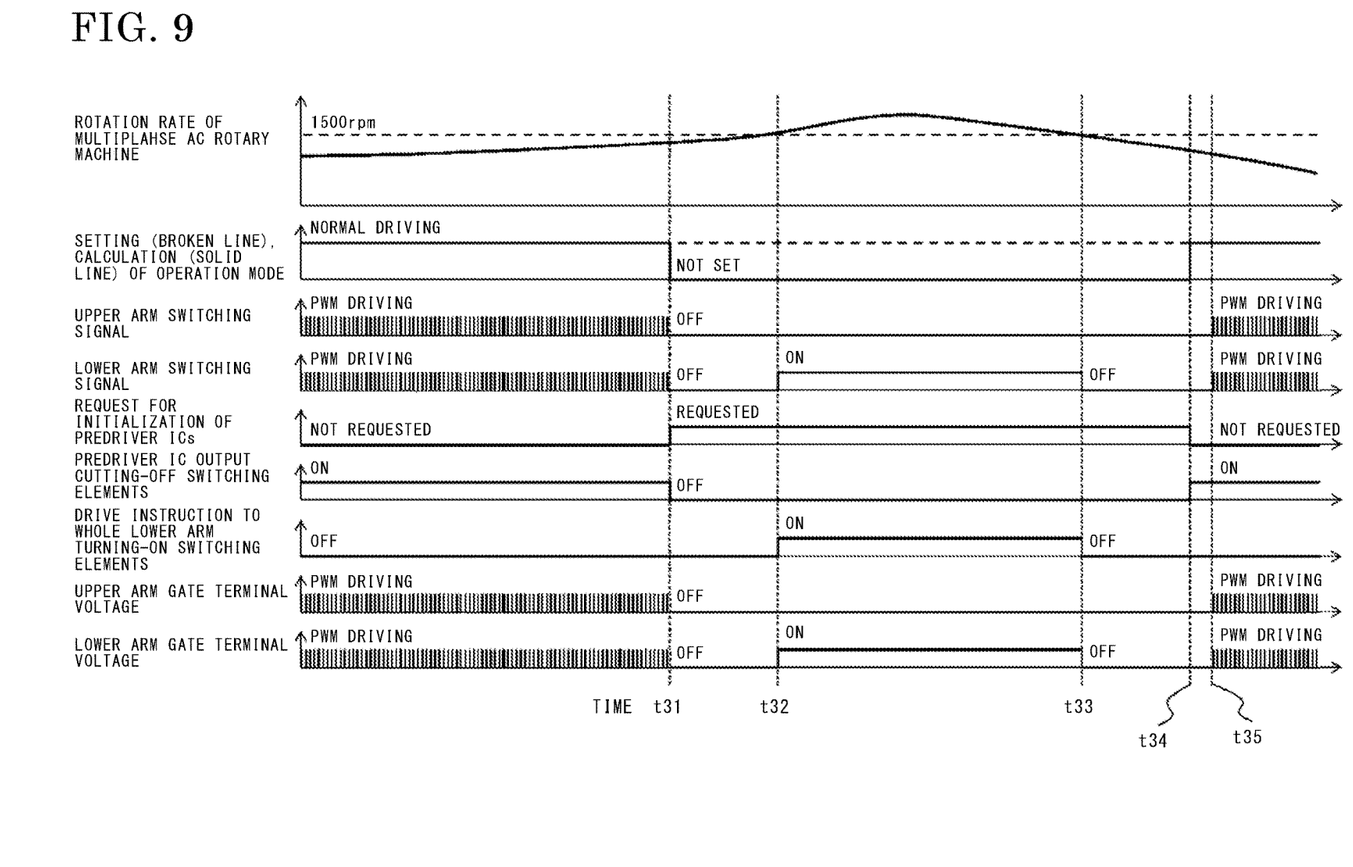
FIG. 9 is a diagram showing the states of respective components of the AC rotary machine control apparatus according to the third embodiment of the present invention when an abnormality occurs therein.
Figure 10:
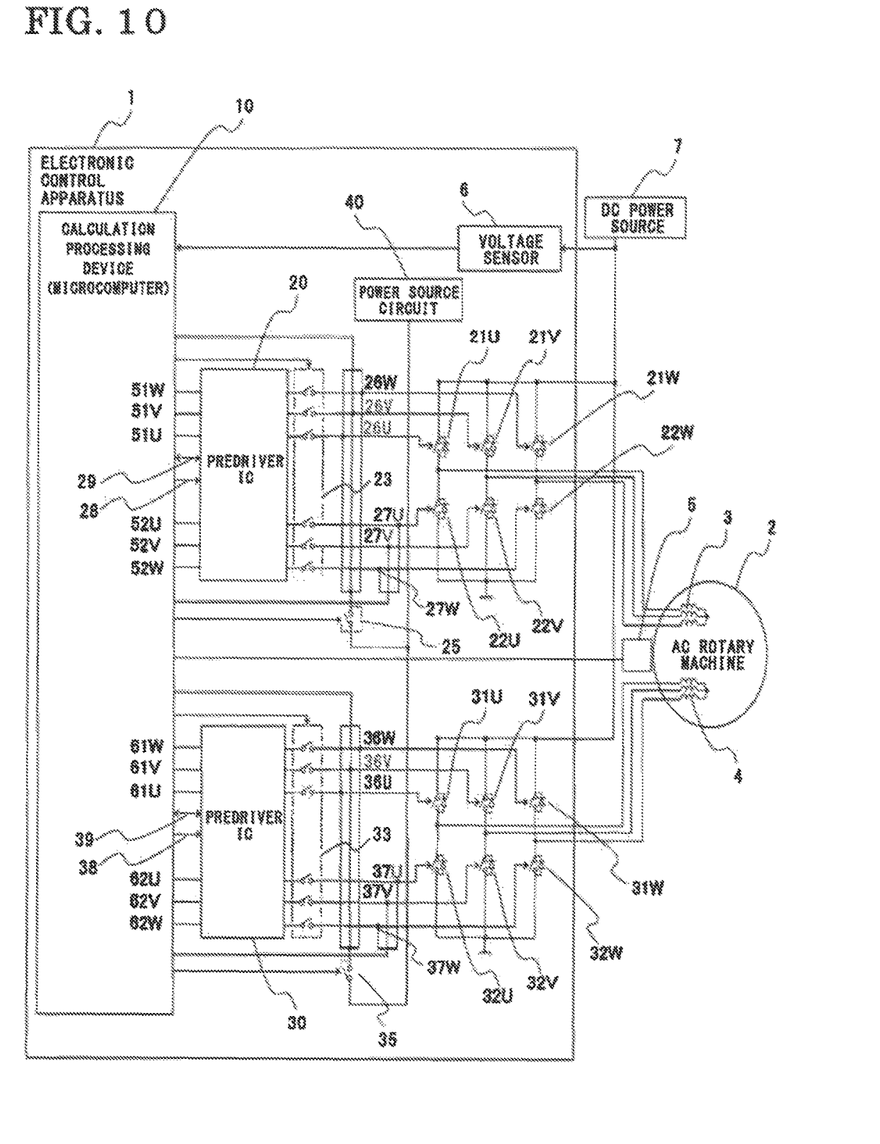
FIG. 10 is a schematic configuration diagram showing an AC rotary machine control apparatus according to an embodiment of the present invention.

FIG. 7 is a block diagram showing the internal configuration of a calculation processing device of an AC rotary machine control apparatus according to a third embodiment of the present invention. FIG. 8 is a flowchart showing an operation of a rotational speed calculating unit in the calculation processing device of the AC rotary machine control apparatus according to the third embodiment of the present invention. FIG. 9 is a diagram showing the states of respective components of the AC rotary machine control apparatus according to the third embodiment of the present invention when an abnormality occurs therein.

In the aforementioned first embodiment, the description has been given of the case where when an induced voltage calculated by the induced voltage calculating unit 12 is greater than a set voltage based on the voltage at the DC power source 7 detected by the voltage sensor 6, drive instructions to the whole first-winding-set lower arm turning-on switching element 25 and the whole second-winding-set lower arm turning-on switching element 35 are turned on (conductive). However, in the third embodiment, a description will be given of a case where, as shown in FIG. 7, the rotational speed calculating unit 11 calculates a rotation rate Spd of the AC rotary machine 2 from rotation angles detected by the rotation angle sensor 5 periodically (for example, every 100 microseconds). When the calculated rotation rate Spd is greater than a rotation rate set value Spd_th which is set on the basis of an induced voltage obtained in advance through an experiment, drive instructions to the whole first-winding-set lower arm turning-on switching element 25 and the whole second-winding-set lower arm turning-on switching element 35 are turned on (conductive).

The other parts are identical to those in the aforementioned first embodiment, and thus the description thereof is omitted.

Operations of the third embodiment will be described on the basis of FIG. 9.

Operations when the predriver ICs normally operate prior to time t31 shown in FIG. 9 are identical to those prior to time t11 of the first embodiment, and thus the description thereof is omitted.

The case of an abnormal state shown in time t31 to t35 in FIG. 9 will be described.

When the predriver ICs erroneously operate due to the surrounding environment such as the temperature or noise and a shift to an unintended operation mode occurs at time t31, the predriver IC abnormality detecting unit 15 of the calculation processing device 10 detects the abnormality state from the internal information of the predriver ICs acquired via the communication paths 29 and 39 relative to the predriver ICs. Alternatively, the predriver IC abnormality detecting unit 15 estimates an operation mode from the acquired internal information by using the operation mode calculating unit 14, compares, at the predriver IC abnormality detecting unit 15, the estimated operation mode with the operation mode set by the operation mode setting unit 13, and detects an abnormality of the predriver ICs when the operation modes do not match with each other.

The predriver IC abnormality detecting unit 15 having detected the abnormality of the internal states of the predriver ICs notifies the rotational speed calculating unit 11 and the switching control signal generating unit 16 of occurrence of the abnormality of the predriver ICs, and outputs Low enable signals through the enable signal lines 28 and 38 for a predetermined time to restart the predriver ICs, thereby initializing the predriver ICs. This state is a state where initialization of the predriver ICs is requested.

The rotational speed calculating unit 11 having been notified of occurrence of the abnormality of the predriver ICs instructs the first-winding-set predriver IC output cutting-off switching element 23 and the second-winding-set predriver IC output cutting-off switching element 33 to be turned off (cut off) to cut off PWM drive signals which are outputted from the predriver ICs and given to the gate terminals of the power converting switching elements, and performs the operation of the flowchart shown in FIG. 8 at predetermined time intervals. Thus, the stable state of the AC rotary machine 2 is maintained.

The switching control signal generating unit 16 having been notified of occurrence of the abnormality of the predriver ICs stops generating and outputting control signals.

An operation of the rotational speed calculating unit 11 will be described on the basis of FIG. 8.

At step S301, the rotational speed calculating unit 11 calculates the rotation rate Spd of the AC rotary machine 2 from rotation angles detected by the rotation angle sensor 5 periodically (for example, every 100 microseconds).

At step S302, the rotational speed calculating unit 11 reads out the rotation rate Spd_th which is set on the basis of an induced voltage obtained in advance through an experiment. For example, the rotation rate Spd_th is set to a rotation rate at which the induced voltage obtained through the experiment becomes the voltage at the DC power source 7, and is set to 1500 rpm indicated by a broken line at the top in FIG. 9.

At step S303, the rotational speed calculating unit 11 compares the calculated rotation rate Spd with the set rotation rate Spd_th. When the calculated rotation rate Spd is determined to be greater than the set rotation rate Spd_th, the operation proceeds to step S304. When the calculated rotation rate Spd is determined to be less than the set rotation rate Spd_th, the operation proceeds to step S305.

At step S304, the rotational speed calculating unit 11 turns on (conducts) drive instructions to the whole first-winding-set lower arm turning-on switching element 25 and the whole second-winding-set lower arm turning-on switching element 35, while the first-winding-set predriver IC output cutting-off switching element 23 and the second-winding-set predriver IC output cutting-off switching element 33 are kept off, to give drive signals from the power source circuit 40 to all the gate terminals of the switching elements 22U, 22V, and 22W for the first winding set lower arm and the switching elements 32U, 32V, and 32W for the second winding set lower arm. As a result of this, voltages at all the gate terminals of the upper arm are off and voltages at all the gate terminals of the lower arm are on. Accordingly, all the switching elements for the lower arm are conductive, and the AC rotary machine 2 enters a three-phase short circuit state, so that no power is generated. Thus, no power flows into the DC power source 7, so that the AC rotary machine 2 also enters a stable state. This state corresponds to the range from time t32 to t33 shown in FIG. 9 in which the calculated rotation rate Spd is greater than the set rotation rate Spd_th.

At step S305, the rotational speed calculating unit 11 turns off (cuts off) drive instructions to the whole first-winding-set lower arm turning-on switching element 25 and the whole second-winding-set lower arm turning-on switching element 35 while the first-winding-set predriver IC output cutting-off switching element 23 and the second-winding-set predriver IC output cutting-off switching element 33 are kept off. As a result of this, voltages at all the gate terminals of the upper arm are off and voltages at all the gate terminals of the lower arm are also off. Accordingly, all the connections between the AC rotary machine 2 and the DC power source 7 are cut off, and power generated by the AC rotary machine 2 does not flow into the DC power source 7, so that the AC rotary machine 2 enters a stable state. This state corresponds to the range from time t33 to t34 shown in FIG. 9 and the range from time t33 to t34 shown in FIG. 9 in which the rotational speed decreases again.

The case where the set rotation rate Spd_th is fixed has been described above. However, hysteresis may be provided to the set rotation rate Spd_th because comparison between the calculated rotation rate Spd and the set rotation rate Spd_th results in prevention of hunting.

Operations after time t34 in FIG. 9 are identical to those after time t14 in FIG. 4 of the first embodiment, and thus the description thereof is omitted.

As described above, in the third embodiment, even when the predriver ICs erroneously operate due to an unexpected failure mode or an influence of the surrounding environment such as the temperature and noise, and stop the outputting functions to the gate terminals, the rotational speed calculating unit 11 obtains the rotation rate without obtaining an induced voltage as in the first embodiment, the AC rotary machine is shifted to and held in a stable state, and the predriver ICs are reset while the stable state is being held. Thus, an unstable state of the AC rotary machine does not continue and the stable state can be held. Accordingly, in the third embodiment, the internal configuration of the calculation processing device 10 can be made into a simplified configuration as shown in FIG. 7 from that shown in FIG. 2 of the first embodiment. Further, since the predriver ICs can be initialized and reset to recover to normal operations while the stable state is being held, deterioration of drivability can also be prevented.

It is noted that within the scope of the present invention, the aforementioned embodiments may be freely combined with each other, or each of the aforementioned embodiments may be modified or abbreviated as appropriate. The present invention is not limited to the aforementioned embodiments.

In the aforementioned embodiments, the case where the AC rotary machine 2 is multiphase and has two winding sets has been described. However, the AC rotary machine 2 may have a single phase or more phases, and may have a single winding set or multiple winding sets. In addition, when predriver ICs corresponding to the respective multiple winding sets are mounted, it is not necessary to perform the same control on all the predriver ICs at the same time, control for an abnormal case may be performed on each predriver IC in which an abnormality has been detected.

Furthermore, the case where three-phase short circuit is realized by the lower arm elements has been described in the aforementioned embodiments. However, three-phase short circuit may be realized by the upper arm elements.

When the predriver ICs erroneously operate due to an unexpected failure mode or an influence of the surrounding environment such as the temperature and noise, and stop the outputting function to the gate driver circuit, outputs of the predriver ICs may be turned on, in both the upper and lower arms, by functions that the predriver ICs have. In this case, the first-winding-set predriver IC output cutting-off switching element 23 and the second-winding-set predriver IC output cutting-off switching element 33 may be omitted.

Various modifications and alterations of this invention will be apparent to those skilled in the art without departing from the scope and spirit of this invention, and it should be understood that this is not limited to the illustrative embodiments set forth herein.

What is claimed is:

1. An AC rotary machine control apparatus comprising:
switching elements bridge-connected to phases of an AC rotary machine to configure upper arm elements and lower arm elements;
a calculation processing device for outputting a control signal for controlling the AC rotary machine;
a predriver IC for giving a drive signal to gates of the switching elements on the basis of the control signal outputted from the calculation processing device;
a predriver IC output cutting-off switching element for operating on the basis of a cutting-off signal from the calculation processing device having detected an abnormality state of the predriver IC, and cutting off the drive signal given from the predriver IC to the gates of the switching elements; and
a gate driver circuit for becoming conductive by receiving a drive signal from a power source circuit on the basis of a signal from the calculation processing device and selectively giving drive signals to the gates of all the lower arm elements of the switching elements, when the drive signal from the predriver IC to gates of the switching elements is being cut off by the predriver IC output cutting-off switching element,
wherein the calculation processing device includes an initializing unit for restarting the predriver IC, when the drive signal from the predriver IC is being cut off.

2. The AC rotary machine control apparatus according to claim 1, wherein
the calculation processing device includes an induced voltage calculating unit for calculating an induced voltage of the AC rotary machine, and
the gate driver circuit is made conductive when the induced voltage calculated by the induced voltage calculating unit is greater than a predetermined voltage value.

3. The AC rotary machine control apparatus according to claim 2, wherein
the predetermined voltage value used by the induced voltage calculating unit is set on the basis of a voltage at a DC power source connected to the AC rotary machine via the switching elements.

4. The AC rotary machine control apparatus according to claim 1, wherein
the calculation processing device includes a rotational speed calculating unit for calculating a rotational speed of the AC rotary machine, and
the gate driver circuit is made conductive when the rotational speed calculated by the rotational speed calculating unit is greater than a predetermined rotational speed value.

5. The AC rotary machine control apparatus according to claim 4, wherein
the predetermined rotational speed value used by the rotational speed calculating unit is set on the basis of a rotation rate at which an induced voltage of the AC rotary machine obtained in advance through an experiment becomes a voltage at a DC power source connected to the AC rotary machine via the switching elements.

6. The AC rotary machine control apparatus according to claim 1, wherein
the AC rotary machine has multiple winding sets,
each of the winding sets is provided with the switching elements, the predriver IC, the predriver IC output cutting-off switching element, and the gate driver circuit, and the calculation processing device detects an abnormality state of the predriver IC of each of the winding sets, independently.

7. The AC rotary machine control apparatus according to claim 1,
wherein the calculation processing device includes a predriver IC abnormality detecting unit for detecting that the predriver IC is in an abnormality state, when internal information of the predriver IC inputted via a communication path is abnormal.

8. The AC rotary machine control apparatus according to claim 1, wherein
the calculation processing device includes a predriver IC abnormality detecting unit for comparing an operation mode which the predriver IC is instructed to set with an operation mode set in the predriver IC, and detects that the predriver IC is in an abnormality state, when the operation modes do not match with each other.

9. The AC rotary machine control apparatus according to claim 1, wherein
the calculation processing device includes a predriver IC abnormality detecting unit for comparing a control signal outputted in order to control the AC rotary machine with a drive signal outputted from the predriver IC and given to the gates of the switching elements, and detecting that the predriver IC is in an abnormality state, when the signals do not match with each other.

10. The AC rotary machine control apparatus according to claim 1, wherein
while, after an abnormal state of the predriver IC is cancelled when the drive signal from the predriver IC is being cut off, a duty ratio of a PWM drive signal given from the predriver IC to the gates of the switching elements is set to obtain an output which is the same as that in an immediately previous state where the abnormality state is being cancelled, the calculation processing device causes the predriver IC to recover to a normal operation state.

11. An AC rotary machine control apparatus comprising:
switching elements bridge-connected to phases of an AC rotary machine to configure upper arm elements and lower arm elements;
a calculation processing device for outputting a control signal for controlling the AC rotary machine;
a predriver IC for giving a drive signal to gates of the switching elements on the basis of the control signal outputted from the calculation processing device;
a predriver IC output cutting-off switching element for operating on the basis of a cutting-off signal from the calculation processing device having detected an abnormality state of the predriver IC, and cutting off the drive signal given from the predriver IC to the gates of the switching elements; and
a gate driver circuit for becoming conductive by receiving a drive signal from a power source circuit on the basis of a signal from the calculation processing device and selectively giving drive signals to the gates of all the upper arm elements of the switching elements, when the drive signal from the predriver IC to gates of the switching elements is being cut off by the predriver IC output cutting-off switching element,
wherein the calculation processing device includes an initializing unit for restarting the predriver IC, when the drive signal from the predriver IC is being cut off.

* * * * *